United States Patent
Duprez (10) Patent No.: US 7,311,091 B2
(45) Date of Patent: Dec. 25, 2007

(54) TEMPERATURE-CONTROLLED PCV VALVE

(75) Inventor: Wayne R. Duprez, Waltham, MA (US)

(73) Assignee: Standard-Thomson Corporation, Waltham, MA (US)

( * ) Notice: Subject to any disclaimer, the term of this patent is extended or adjusted under 35 U.S.C. 154(b) by 0 days.

(21) Appl. No.: 11/462,276

(22) Filed: Aug. 3, 2006

(65) Prior Publication Data

US 2007/0028904 A1 Feb. 8, 2007

Related U.S. Application Data

(60) Provisional application No. 60/705,685, filed on Aug. 4, 2005.

(51) Int. Cl.
*F02M 25/06* (2006.01)
(52) U.S. Cl. ...................... 123/574; 138/145
(58) Field of Classification Search ................ 123/574; 137/504; 138/37, 40–46; 251/118, 120
See application file for complete search history.

(56) References Cited

U.S. PATENT DOCUMENTS

| 3,263,660 A | 8/1966 | Hyde |
| 3,340,899 A * | 9/1967 | Welty et al. ................... 138/43 |
| 3,359,960 A | 12/1967 | Pittsley |
| 3,709,204 A | 1/1973 | Noponen |
| 3,766,898 A | 10/1973 | McMullen |
| 3,999,522 A * | 12/1976 | Jaulmes ................. 123/184.56 |
| 4,483,309 A | 11/1984 | Norman et al. |
| 4,592,390 A * | 6/1986 | Boyd .......................... 138/45 |
| 4,625,703 A | 12/1986 | Otto et al. |
| 4,715,403 A | 12/1987 | Szlaga |
| 4,793,372 A | 12/1988 | Gauthier et al. |
| 5,024,203 A | 6/1991 | Hill |
| 5,697,351 A | 12/1997 | Schumacher |
| 6,546,921 B1 * | 4/2003 | Callahan ..................... 123/573 |
| 6,640,793 B1 | 11/2003 | Kabat et al. |
| 6,807,958 B2 | 10/2004 | Kabat et al. |
| 7,017,564 B2 | 3/2006 | Duprez et al. |
| 2006/0000459 A1 * | 1/2006 | Freeman et al. ............ 123/574 |

OTHER PUBLICATIONS

Toyota Motor Sales, U.S.A., Inc. Brochure, "Emission Sub Systems—Positive Crankcase Ventilation System," pp. 1-5, date unknown.

* cited by examiner

*Primary Examiner*—Marguerite McMahon
(74) *Attorney, Agent, or Firm*—Barnes & Thornburg LLP (57) ABSTRACT

A positive crankcase ventilation valve includes a flow restrictor movable in an orifice to vary flow of fumes from a crankcase to an intake manifold in a vehicle.

35 Claims, 7 Drawing Sheets

FIG. 6

TEMPERATURE-CONTROLLED PCV VALVE

This application claims priority under 35 U.S.C. § 119(e) to U.S. Provisional Application Ser. No. 60/705,685, filed Aug. 4, 2005, which is expressly incorporated by reference herein.

BACKGROUND

The present disclosure relates to vehicle engines, and particularly to apparatus for venting fumes present in an engine crankcase. More particularly, the present disclosure relates to a Positive Crankcase Ventilation (PCV) valve having a variable-flow orifice.

A PCV valve helps control pollution from vehicles by returning crankcase fumes to the engine's intake manifold to be mixed with incoming filtered combustion air and inducted into the cylinders of the engine. A mixture of crankcase fumes, air, and fuel then is combusted in the engine cylinders during a combustion cycle to power the vehicle engine. Thus, the crankcase fumes are burned and not just discharged into the atmosphere.

During a normal compression stroke of an engine piston in an engine cylinder providing a combustion chamber, a small amount of gases in the combustion chamber escapes past the piston and enters the crankcase. Such "blowby" gases include unburned fuel that can dilute and contaminate engine oil, cause corrosion to engine parts, and contribute to sludge build up in the engine. PCV valves cooperate to remove these blowby gases from the crankcase and combine them with the engine's normal incoming air/fuel mixture before such a mixture is burned in the engine.

SUMMARY

A positive crankcase ventilation (PCV) valve in accordance with the present disclosure includes a flow restrictor that is movable in a variable-size flow-metering orifice as the "effective size" of the flow-metering orifice is changed. Such movement of the flow restrictor in the variable-size flow-metering orifice varies flow of crankcase fumes passing through the flow-metering orifice to reach the engine intake manifold.

The flow restrictor includes a pintle that extends upwardly through the flow-metering orifice. In illustrative embodiments, the flow restrictor includes a base underlying the pintle and the pintle is a multi-stage element comprising several control portions of different outside diameters.

The variable-size flow-metering orifice is formed in a deformable orifice plate provided in an interior region of a valve housing shell. The orifice plate deforms in response to changing temperature of crankcase fumes passing through the orifice plate to vary the size of the flow-metering orifice formed in the deformable orifice plate while one of the control portions of the pintle is arranged to extend through the flow-metering orifice.

In illustrative embodiments, the deformable orifice plate is configured to "deform" (e.g., change shape) when exposed to changing temperature of crankcase fumes flowing through the valve housing shell to increase or decrease the effective size of the flow-metering orifice. In illustrative embodiments, the pintle included in the flow restrictor is relocated in the variable-size flow-metering orifice to different positions as a function of: (1) engine throttle valve position (e.g., idle or wide-open) and (2) crankcase fuel vapor (i.e., fume) temperature (e.g., cold at cold-engine start and hot during hot-running operation).

In illustrative embodiments, the deformable orifice plate is a temperature-activated element made of a temperature-activated material such as a shape-memory alloy or a bi-metal material. This temperature-activated element deforms in reaction to temperature change in the valve housing shell to increase or decrease the effective size of the flow-metering orifice. In one embodiment, the deformable orifice plate includes a circular outer rim and radially inwardly extending fins cantilevered to an inner edge of the circular outer rim. The flow-metering orifice is defined by space provided between the fins and the effective size of the flow-metering orifice changes as the fins move relative to one another and relative to the outer rim as the temperature of crankcase fumes flowing around and over the fins changes.

In illustrative embodiments, the PCV valve also includes a yieldable plate support interposed between the rim of the deformable orifice plate and the base of the flow restrictor. The yieldable plate support is a coiled compression spring arranged to support the deformable orifice plate in an elevated position above the base of the flow restrictor while the pintle extends through the flow-metering orifice formed in the deformable orifice plate. The plate support is configured to "yield" in response to changing pressure conditions in the valve housing to change the elevation of the deformable orifice plate in the valve housing relative to the pintle included in the flow restrictor.

In operation, a "temperature" input is used to move the fins relative to the rim and to one another to change the effective size of the variable-size flow-metering orifice receiving the pintle to account for temperature of crankcase fumes admitted into the valve housing. In an illustrative embodiment, the fins (1) expand and move relative to the rim when heated to a high temperature (e.g., hot engine) to provide the deformable orifice plate with a substantially flat shape and (2) contract and move relative to the rim when cooled to a low temperature (e.g., cold engine) to provide the deformable orifice plate with a substantially frustoconical shape. At the same time, a "differential pressure" input is used to move the pintle of the flow restrictor in the variable-size flow-metering orifice relative to the rim in the deformable orifice plate to account for a differential pressure applied to top and bottom portions of the flow restrictor as crankcase fumes flow through the valve housing.

When the engine throttle valve is wide open, a "low" vacuum is applied to the interior region of the valve housing shell through the engine intake manifold to cause a "small" pressure differential to be applied to top and bottom portions of the flow restrictor. Under this condition, the spring interposed between the rim of the deformable orifice plate and the base of the flow restrictor to provide the plate support is "uncompressed" and thus arranged to urge the base of the flow restrictor away from the deformable orifice plate to place a small-diameter control portion of the pintle in the flow-metering orifice formed in the deformable orifice plate.

In contrast, when the engine throttle valve is set to idle the engine, a relatively "high" vacuum is applied to the interior region of the valve housing shell through the engine intake manifold to cause a relatively "large" pressure differential to be applied to top and bottom portions of the flow restrictor. Under this condition, the spring providing the plate support is "compressed" to allow the flow restrictor to move upwardly relative to the deformable orifice plate to place a large-diameter control portion of the pintle in the flow-metering orifice formed in the deformable orifice plate.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 2 is a schematic view of components included in the PCV valve of FIG. 1 showing a "multi-stage" flow restrictor mounted for movement in a valve housing shell to regulate flow of crankcase fumes through a "variable-size" flow-metering orifice formed in a deformable orifice plate that includes a rim and movable fins that are coupled to the rim and are configured to "deform" when exposed to changing temperature of crankcase fumes flowing through the valve housing shell to increase or decrease the "effective size" of the flow-metering orifice defined by the space provided between the movable fins and also showing a plate support interposed between the flow restrictor and the rim of the deformable orifice plate and suggesting that the flow restrictor is movable in the variable-size flow-metering orifice relative to the deformable orifice plate to locate either a small-diameter (first-stage) control portion, an intermediate-diameter (second-stage) control portion, or a large-diameter (third-stage) control portion in the variable-size flow-metering orifice as a function of temperature and pressures extant in the valve housing shell;

FIG. 3 is an exploded perspective view of components included in an illustrative embodiment of a PCV valve in accordance with the present disclosure showing in sequence (from top to bottom) an upper valve housing formed to include an interior region and a top outlet opening into the interior region, a deformable orifice plate comprising an outer rim surrounding and carrying a series of radially inwardly extending fins that cooperate to define a variable-size flow-metering orifice, a coiled compression spring that provides the plate support, a flow restrictor sized to move up and down in the variable-size flow-metering orifice and configured to include a multi-stage upright pintle anchored to an underlying disk-shaped base, and a lower valve housing that is configured to mate with the upper valve housing to establish the valve housing shell and formed to include a bottom inlet that will open into the interior region of the upper valve housing when the upper and lower valve housings are mated;

FIGS. 4-7 illustrate (1) movement of the flow restrictor in the valve housing shell to a lowered "wide-open throttle" position whenever the engine throttle valve is wide open and to a raised "engine-idle" position whenever the engine throttle valve is moved to idle the engine (whether the engine is cold or hot) and (2) deformation of the deformable orifice plate to vary the effective size of the flow-metering orifice in response to changing temperature of crankcase fumes flowing through the variable-size flow-metering orifice;

FIG. 4 is a schematic view of a portion of the vehicle engine system of FIG. 1 along with an enlarged sectional view of the PCV valve of FIG. 3 after assembly when the engine is cold and the throttle valve is "wide open" showing (1) deformation of the deformable orifice plate to assume a frustoconical shape in response to exposure of a series of radially inwardly extending fins, which fins are made of a temperature-activated shape-memory material, to a predetermined cold temperature present in the PCV valve when the engine is "cold" and (2) the deformable orifice plate supported on a plate-support spring in the raised wide-open throttle position when the engine throttle valve is wide open so that flow of low-temperature fuel vapor (fumes) from the crankcase to the engine intake manifold is increased;

DETAILED DESCRIPTION

Figure 1:
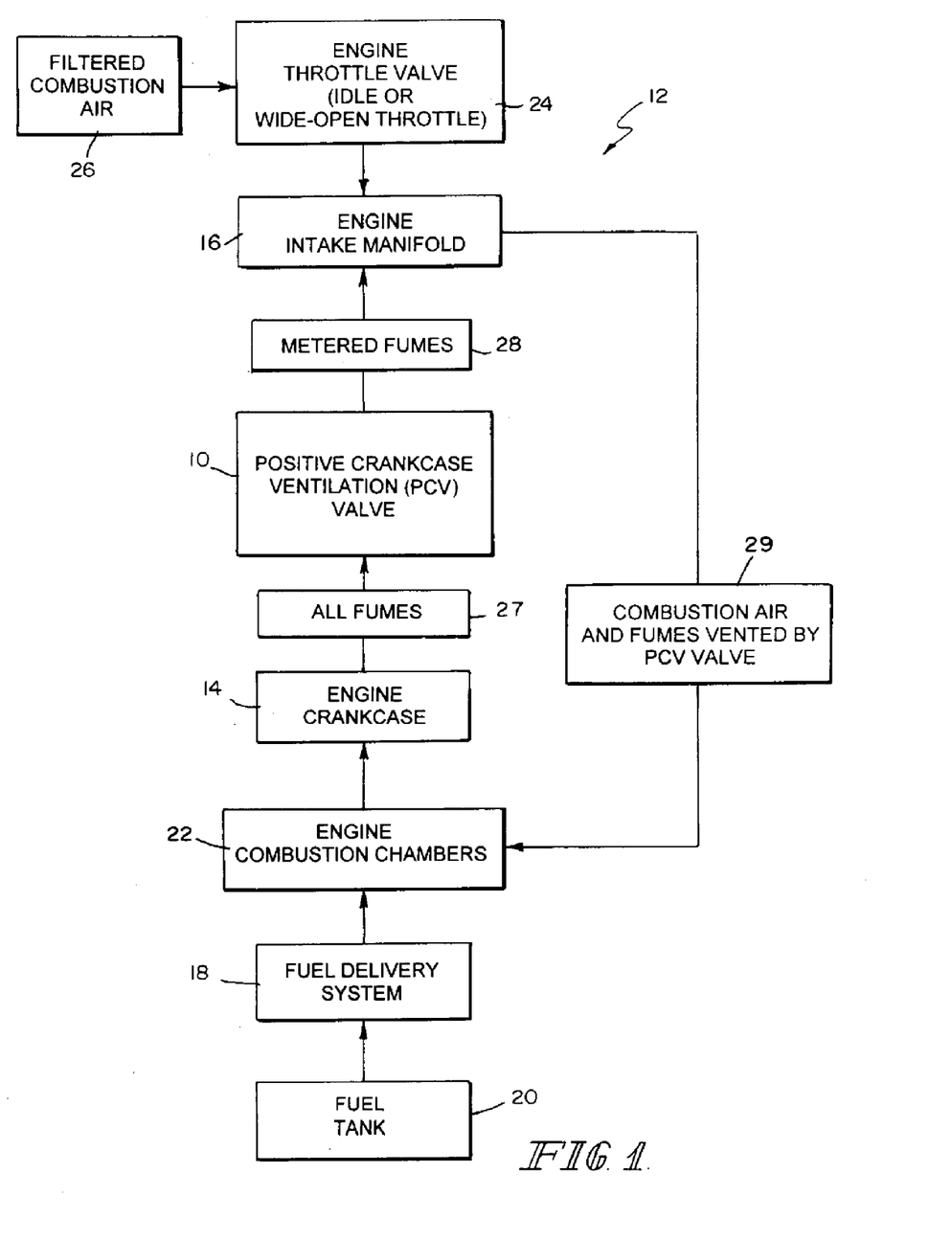
FIG. 1 is a schematic view of a vehicle engine system including a Positive Crankcase Ventilation (PCV) valve in accordance with the present disclosure.

A positive crankcase ventilation (PCV) valve 10 is included in an engine 12 shown diagrammatically in FIG. 1. PCV valve 10 controls the flow of fuel vapor fumes from engine crankcase 14 to engine intake manifold 16. The PCV valve 10 in accordance with the present disclosure is configured to (A) sense whether the engine is (1) idling or running at wide-open throttle and (2) cold (such as during engine start-up) or hot and then (B) change the flow rate of fuel vapor fumes exhausted from engine crankcase 14 and delivered to engine intake manifold 16 in accordance with predetermined performance criteria as suggested, for example, in FIGS. 4-7.

In the block diagram illustrated in FIG. 1, engine 12 also includes a valve housing fuel delivery system 18 for delivering fuel as needed from fuel tank 20 to engine combustion chambers 22. An engine throttle valve 24 is manipulated by an engine operator to regulate flow of filtered combustion air 26 into engine intake manifold 16. PCV valve 10 receives all fumes 27 discharged from engine crankcase 14 and then discharges a metered flow of fumes 28 into engine intake manifold 16 to mix with filtered combustion air 26 passing through engine intake manifold 16. A mixture 29 of filtered combustion air 26 and fumes 28 vented by PCV valve 10 is inducted from engine intake manifold 16 into engine combustion chambers 22 to mix with fuel delivered by fuel delivery system 18 to create a combustible air-fuel mixture that is burned in engine combustion chambers 22 during operation of engine 12. It is within the scope of this disclosure to use PCV valve 10 in any suitable engine system. Reference is made to U.S. Pat. No. 6,640,793 for disclosure relating to a valve assembly and method for controlling flow of gases from an engine crankcase to an engine intake manifold, which disclosure is hereby incorporated by reference herein.

Figure 2:
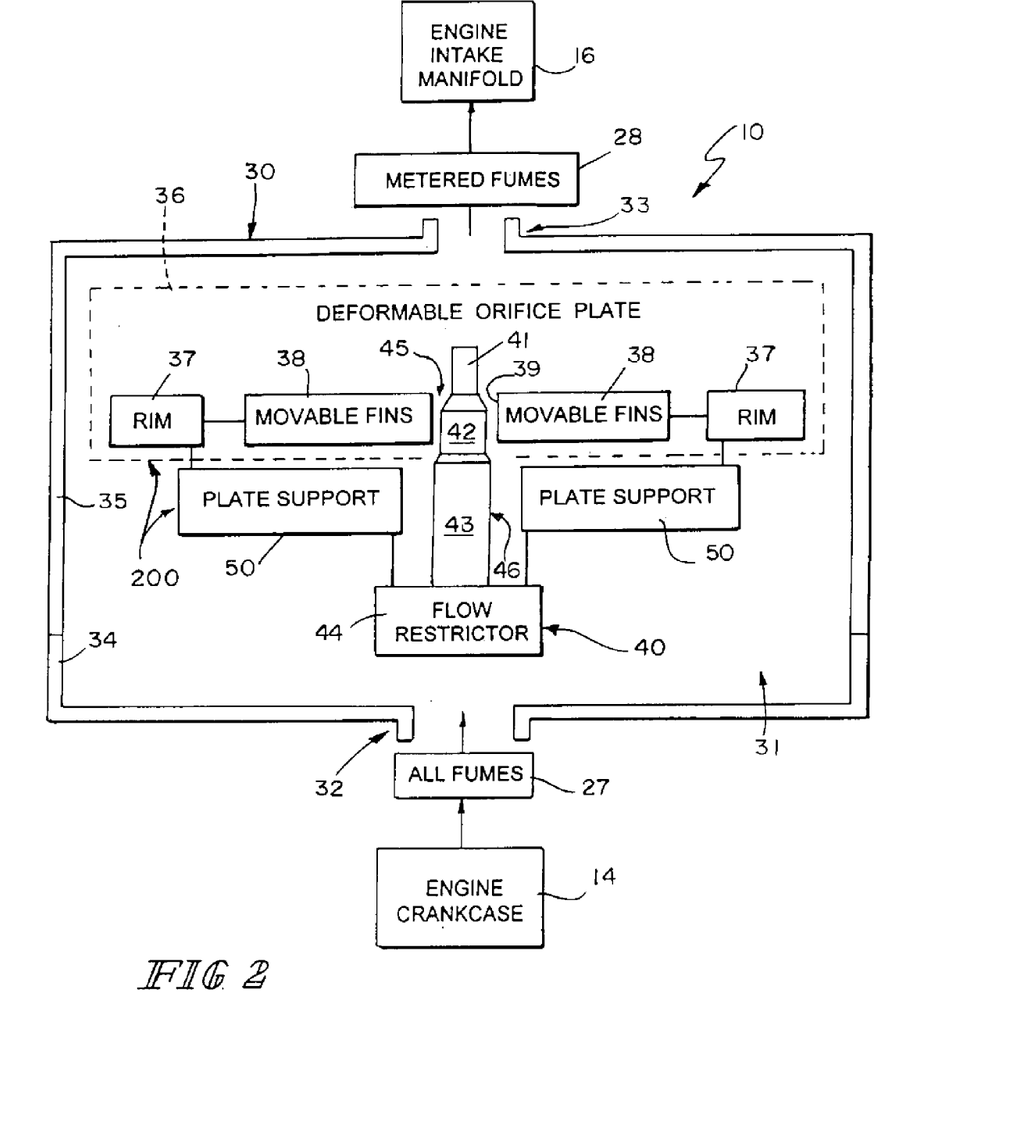

In the block diagram illustrated in FIG. 2, PCV valve 10 includes a valve housing shell 30 formed to include an inlet 32 coupled to engine crankcase 14 to receive crankcase fumes 27 and an outlet 33 for discharging metered fumes 28 to engine intake manifold 16. Illustratively, a lower valve housing 34 including inlet 32 cooperates with an upper valve housing 35 including outlet 33 to form valve housing shell 30 as suggested diagrammatically in FIG. 2.

Figure 3:
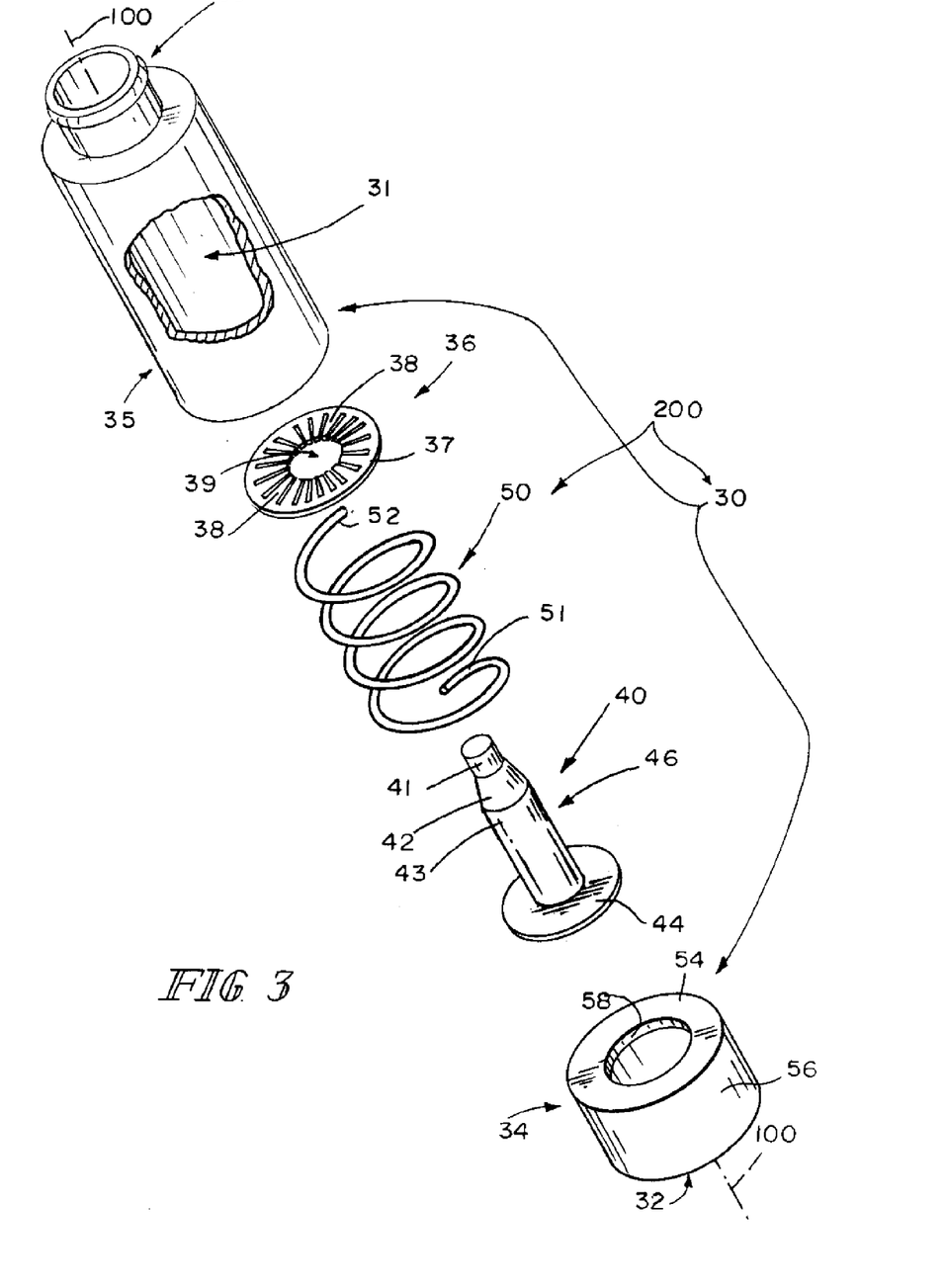

PCV valve 10 further includes a deformable orifice plate 36 located in an interior region 31 of shell 30 as suggested diagrammatically in FIG. 2 and illustratively in FIGS. 4-7. As suggested in FIG. 3, deformable orifice plate 36 includes a ring-shaped rim 37 and a plurality of fins 38 coupled to rim 37. Rim 37 is ring-shaped in the illustrated embodiment. Fins 38 cooperate to define therebetween a variable-size flow-metering orifice 39 as shown in FIG. 3. Deformable orifice plate 36 deforms in response to temperature changes to assume a substantially flattened shape (when heated) to reduce the effective size of flow-metering orifice 39 as shown, for example, in FIGS. 3, 5, 7, and 7A and to assume a substantially frustoconical shape (when cooled) to enlarge the effective size of flow-metering orifice 39 as shown, for example, in FIGS. 4, 6, and 6A.

PCV valve 10 also includes a flow restrictor 40 located in interior region 31 of shell 30 and mounted for movement in flow-metering orifice 39 formed in deformable orifice plate 36. Flow restrictor 40 includes a base 44 and an upright pintle 46 extending upwardly from base 44 as shown in FIG. 3. In an illustrative embodiment, pintle 46 includes a small-diameter, first-stage control portion 41, an intermediate-diameter, second-stage control portion 42, and a large-diameter, third-stage control portion 43 as suggested in FIG. 3.

Fins 38 of orifice plate 36 cooperate to form a serpentine interior border edge defining orifice 39 and providing a first flow-metering surface bordering orifice 39. Pintle 46 of flow restrictor 40 extends into orifice 39 as suggested in FIG. 2 and control portions 41, 42, and 43 cooperate to provide a second flow-metering surface on the exterior of pintle 46. That second flow-metering surface cooperates with the opposing first flow-metering surface to define a variable flow-metering channel 45 therebetween. The effective size of the flow-metering channel 45 is varied by up-and-down movement of upright pintle 46 of flow restrictor 40 in orifice 39 owing, in part, to the varying cross-sectional dimensions of control portions 41, 42, and 43 of upright pintle 46 located in flow-metering orifice 39.

A plate support 50 is also included in PCV valve 10 as shown diagrammatically in FIG. 2 and illustratively in FIG. 3. Plate support 50 cooperates with deformable orifice plate 36 to form a flow regulator 200. Plate support 50 is a yieldable member and configured to support deformable orifice plate 36 normally in a predetermined position relative to flow restrictor 40 to cause upright pintle 46 of flow restrictor 40 to extend into variable-shape flow-metering orifice 39 and thereby cooperate to define variable flow-metering channel 45. In an illustrative embodiment, plate support 50 is a coiled compression spring having a lower end 51 arranged to engage a portion of flow restrictor 40 and an upper end 52 arranged to engage an underside of deformable orifice plate 36 as suggested in FIGS. 3 and 4.

Figure 5:
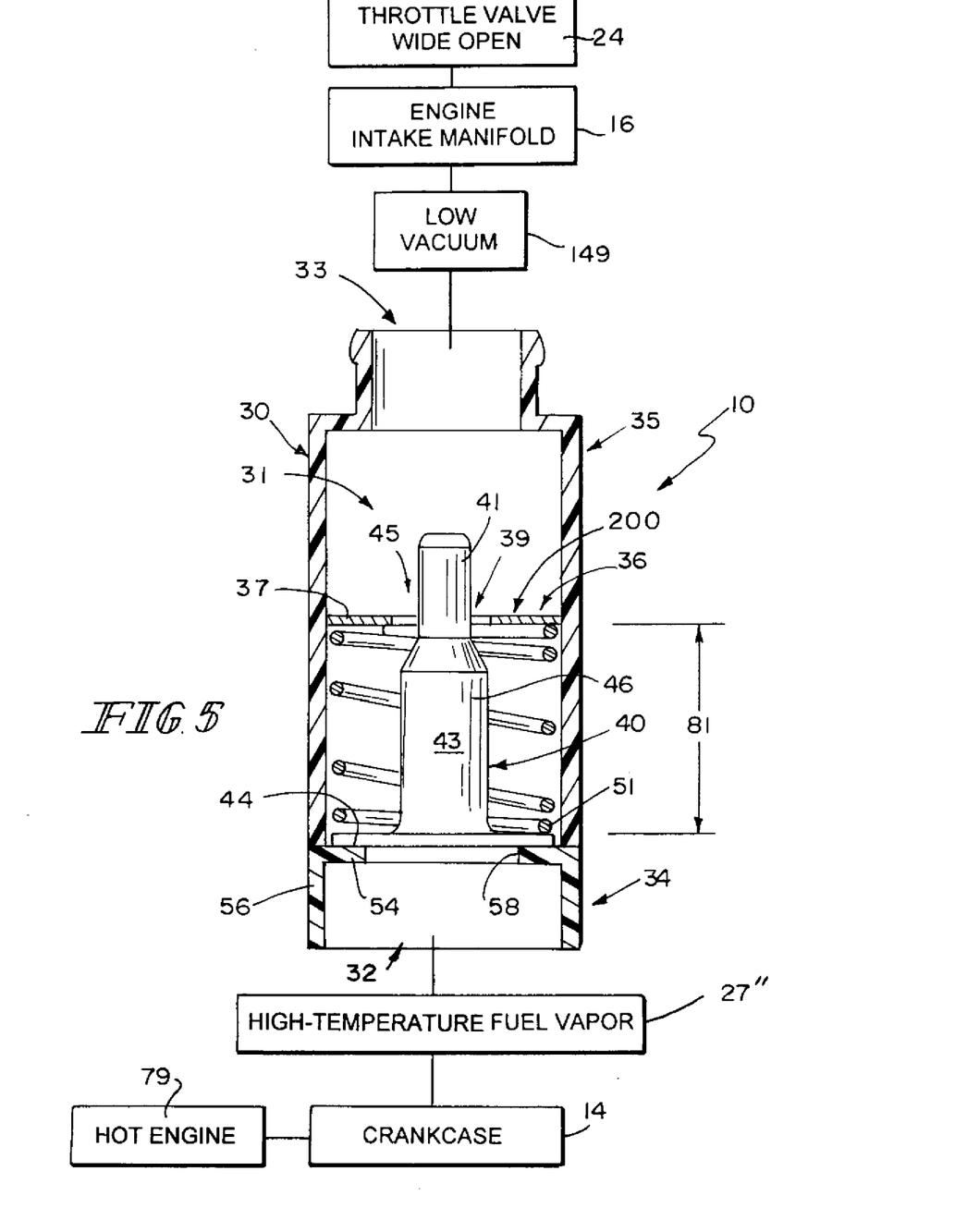
FIG. 5 is an illustration similar to FIG. 4 when the engine is hot and the throttle valve is wide open showing (1) that the deformable orifice plate remains in the raised wide-open throttle position and (2) deformation of the deformable orifice plate to assume a flattened shape (see, e.g., FIG. 7A) in response to exposure of the series of "temperature-activated" radially inwardly extending fins included in the deformable orifice plate to a predetermined hot temperature present in the PCV valve when the engine is "hot" to decrease flow of high-temperature fuel vapor (fumes) from the crankcase to the engine intake manifold.
Figures 6, 6A:
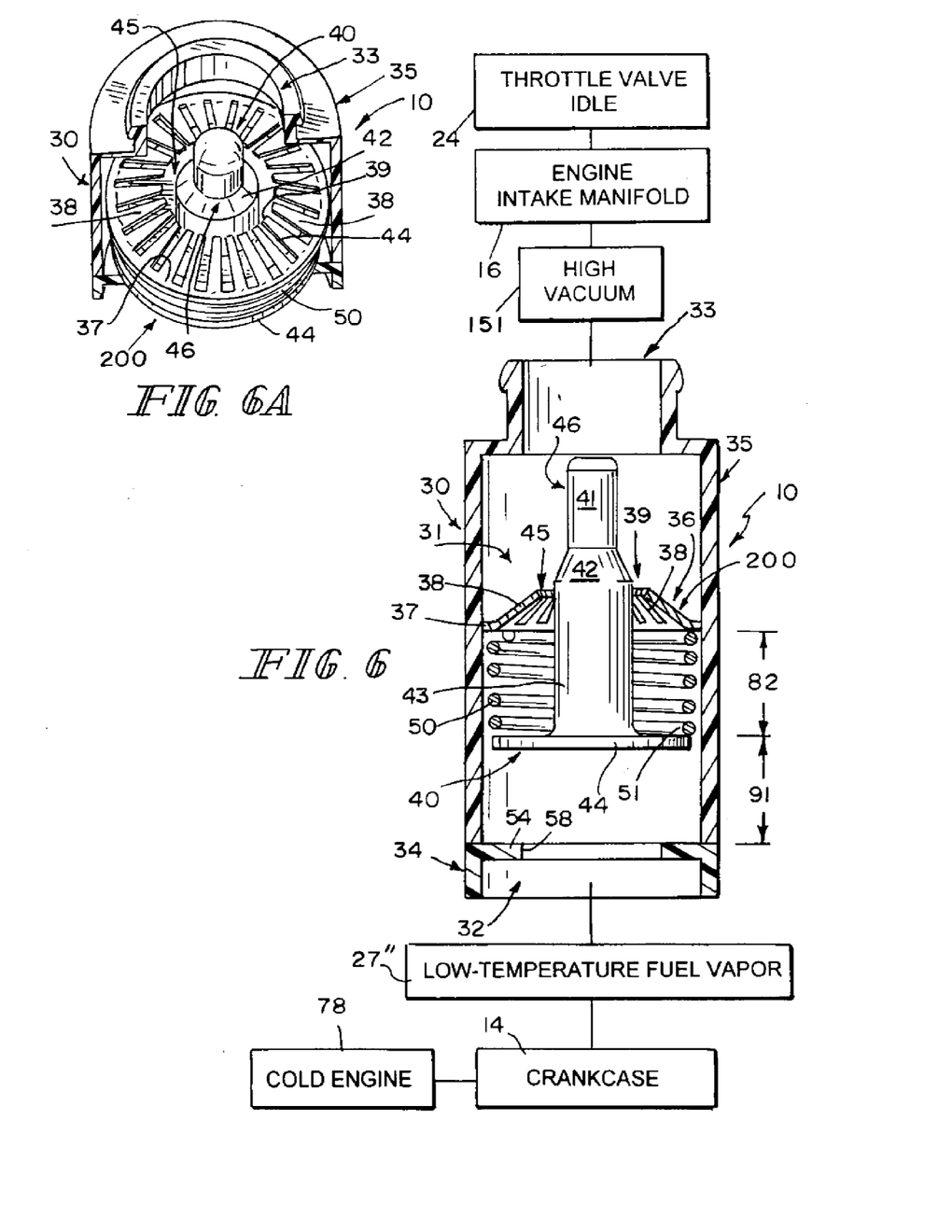
FIG. 6 is an illustration similar to FIGS. 4 and 5 when the engine is "cold" and the throttle valve is arranged to cause the engine to "idle" showing (1) deformation of the deformable orifice plate to assume a frustoconical shape in response to exposure of a series of radially inwardly extending fins, which fins are made of a temperature-activated shape-memory material, to a predetermined cold temperature present in the PCV valve when the engine is "cold" and (2) upward movement of the flow restrictor to the raised engine-idle position (to compress the plate-support spring) when the throttle valve is arranged to cause the engine to idle so that flow of low-temperature fuel vapor (i.e., fumes) from the crankcase to the engine intake manifold is increased.
FIG. 6A is a perspective view of the PCV valve of FIG. 6, with portions of the valve housing shell broken away, showing enlargement of the effective size of the flow-metering orifice defined by and between the radially inwardly extending fins anchored to a ring-shaped rim upon movement of free ends of those fins in an upward direction toward a top outlet opening of the valve housing shell along a central vertical axis extending through the flow restrictor in response to exposure of those fins to a predetermined cold temperature.

As shown, for example, in FIGS. 3 and 6A, orifice plate 36 includes a circular outer rim 37 and a series of radially inwardly extending fins 38 cantilevered to an inner edge of the circular outer rim 37. Each fin 38 has a wide end coupled to rim 37 and is tapered to terminate at a relatively narrower free end. The free ends of the circumferentially spaced-apart fins 38 cooperate to form a round opening adapted to receive the upright pintle 46 of flow restrictor 40 as suggested in FIGS. 3 and 4. Flow-metering orifice 39 is defined by the space between each pair of adjacent fins 38 plus the round opening defined by the free ends of fins 38. The effective size of this flow-metering orifice 39 is enlarged when orifice plate 36 is deformed (e.g., when cooled) to assume the frustoconical shape illustrated in FIGS. 4, 6, and 6A and is reduced when orifice plate 36 is deformed (e.g., when heated) to assume the flattened shape illustrated in FIGS. 3, 5, 7, and 7A. Orifice plate 36 is a monolithic element made of a temperature-activated material in the illustrated embodiment.

Flow restrictor 40 is arranged to move up and down in interior region 31 of shell 30 and is arranged to lie in a space under deformable orifice plate 36 and above a restrictor platform or support flange 54 provided by lower valve housing 34. In an illustration embodiment, lower valve housing 34 includes a cylindrical side wall 56 having an annular upper edge terminating at restrictor platform 54 as shown in FIG. 3. Restrictor platform 54 is a ring-shaped plate formed to include a central aperture 58.

Flow restrictor 40 includes a plurality of differently sized control portions which are positionable in orifice 39 to vary flow through flow-metering channel 45, depending upon which control portion is positioned in orifice 39 and the shape of orifice plate 36 as shown, for example, in FIGS. 4-10. Illustratively, flow restrictor 40 includes a group of first, second, and third control portions 41, 42, 43. Also in the illustrated embodiment, first control portion 41 has a small-diameter cylindrical shape, second control portion 42 has a frustoconical shape, and third control portion 43 has a large-diameter cylindrical shape. Control portions 41, 42, and 43 are aligned along axis 100.

Figure 4:
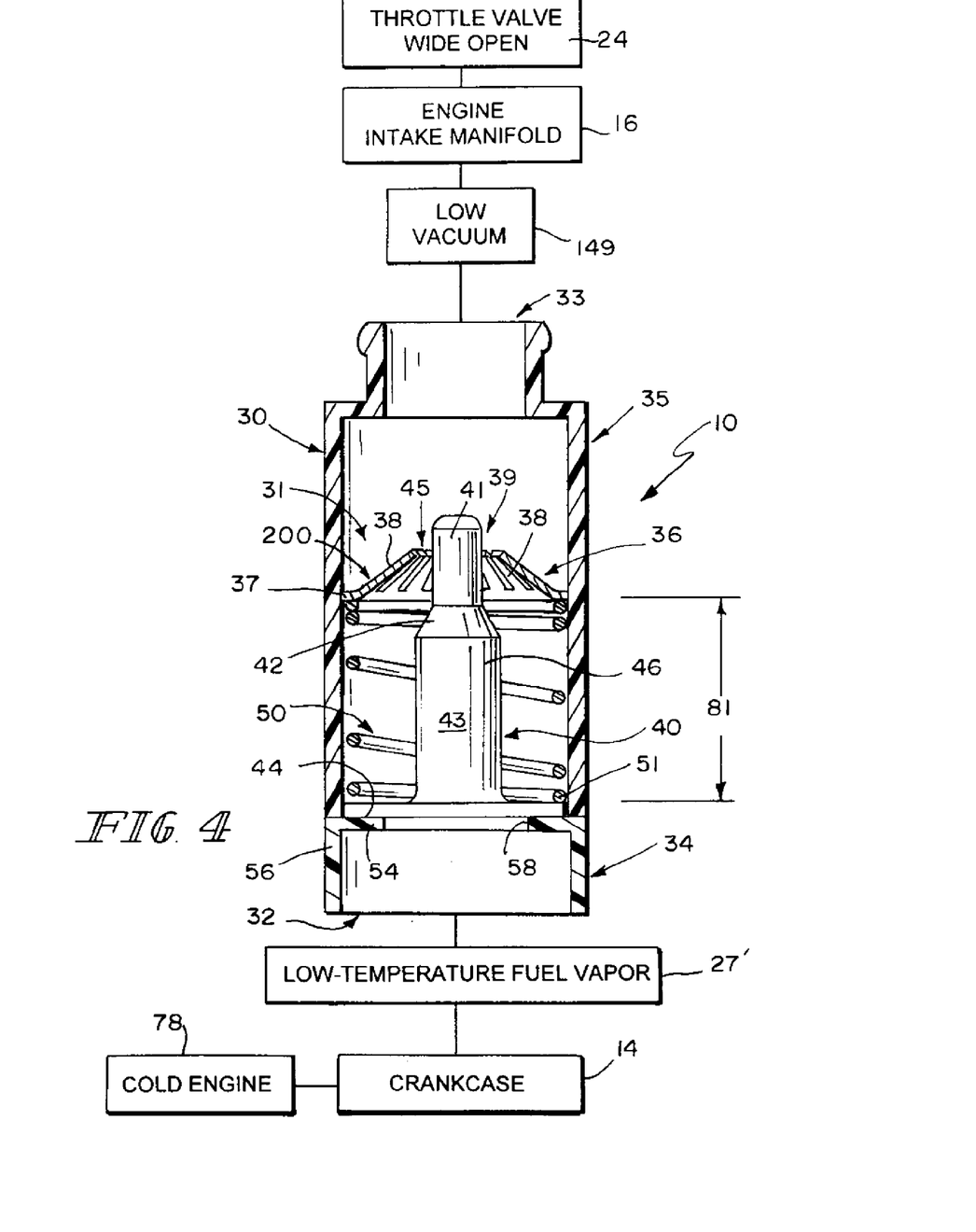

Plate support 50 is arranged to wind around upright pintle 46 of flow meter 40 as suggested in FIGS. 3 and 4. Lower end 51 of plate support 50 contacts an upwardly facing surface on base 44 of flow restrictor 40 and upper end of plate support 50 contacts a downwardly facing surface of circular rim 27 of deformable orifice plate 36.

When the components comprising PCV valve 10 are assembled and throttle valve 24 is wide open as shown in FIGS. 4 and 5, base 44 of flow meter 40 rests on annular restrictor platform 54 and plate support 50 (interposed between base 44 of flow meter 40 and rim 27 of deformable orifice plate 36) rests on base 44 and is extended fully to elevate deformable orifice plate 36 above flow meter base 44. During a hot-engine condition 79, when crankcase fumes 27" passing through valve housing 30 are relatively hot, a temperature-activated material such as a shape-memory alloy (e.g., nitinol) used to make deformable orifice plate 36 is heated to change from a martensitic (cold) state to an austenitic (hot) state and move to assume the substantially flattened shape shown in FIGS. 3, 5, 7, and 7A. When crankcase fumes 27' are relatively cold during a cold-engine condition 78, the temperature-activated material used to make deformable orifice plate 36 cools and thus is returned to the martensitic (cold) state and moves to assume the substantially frustoconical shape shown in FIGS. 4, 6, and 6A.

Figures 7, 7A:
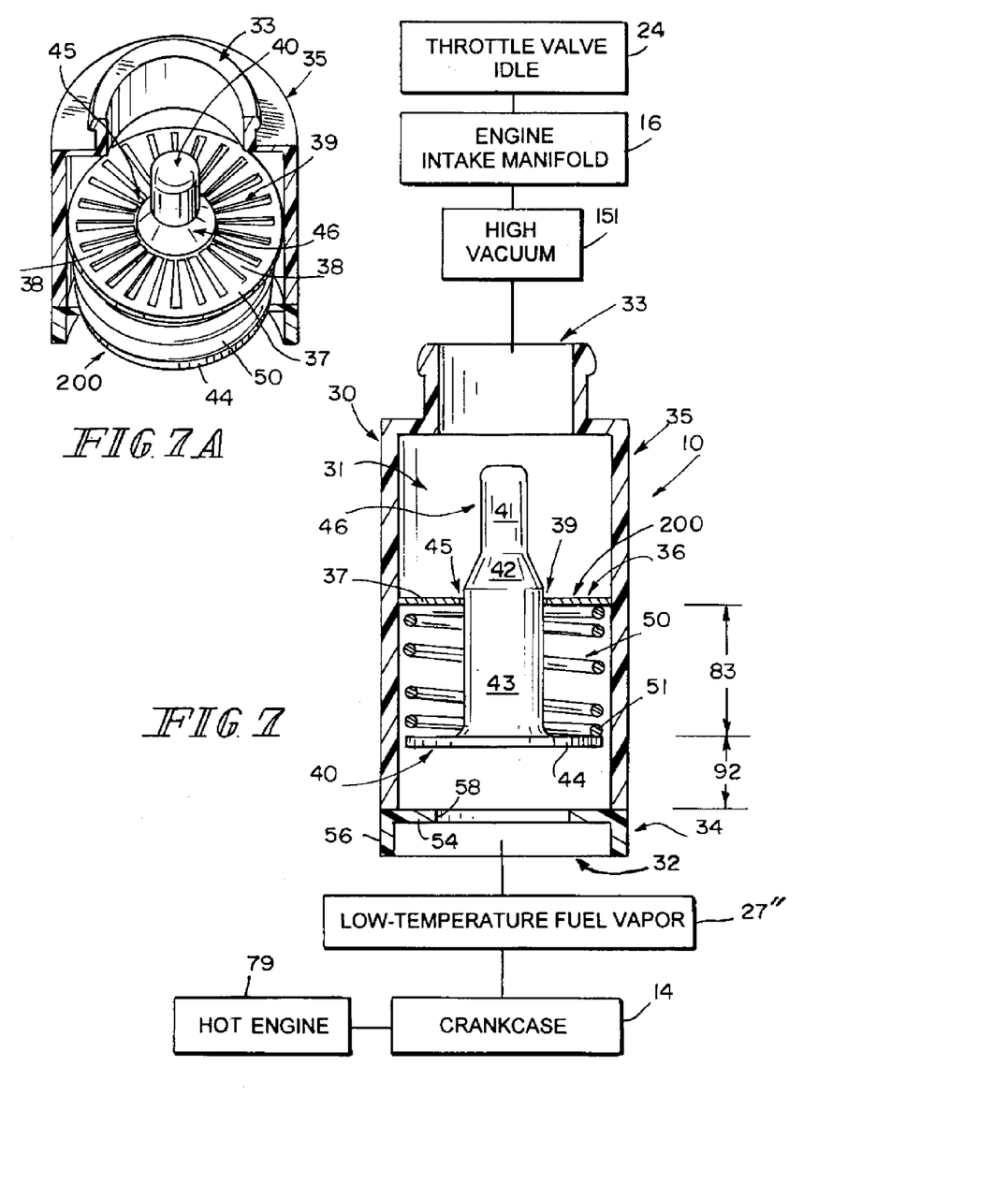
FIG. 7 is an illustration similar to FIGS. 4-6 when the engine is "hot" and the throttle valve is arranged to cause the engine to "idle" and showing (1) that the deformable orifice plate remains in the raised engine-idle position and (2) deformation of the deformable orifice plate to assume a flattened shape in response to exposure of the series of "temperature-activated" radially inwardly extending fins to a predetermined hot temperature present in the PCV valve when the engine is "hot" to decrease flow of high-temperature fuel vapor (fumes) from the crankcase to the engine intake manifold.
FIG. 7A is a perspective view similar to FIG. 6A showing reduction of the effective size of the flow-metering orifice defined by and between the radially inwardly extending fins anchored to the ring-shaped rim upon movement of free ends of those fins in a downward direction toward a bottom inlet opening of the valve housing shell along the central vertical axis in response to exposure of those fins to a predetermined hot temperature.

Flow restrictor 40 is configured to react to the engine throttle valve position to move flow restrictor 40 in flow-metering orifice 39 in response to changing differential pressure conditions between engine intake manifold 16 and engine crankcase 14 that are manifested in interior region 31 of shell 30. Plate support 50 is made of a yieldable material and is arranged to locate rim 37 at a first distance 81 above base 44 when crankcase fumes 27 admitted into shell 30 travel through shell 30 at a "relatively low" flow rate when, for example, engine throttle valve 24 is "wide open" and a low vacuum 149 is applied by engine intake manifold 16 to outlet 33 of upper valve housing 35 as shown in FIGS. 4 and 5. Plate support 50 is a coiled compression spring in an illustrative embodiment. When engine throttle valve 24 is "at idle" and a high vacuum 151 is applied by engine intake manifold to outlet 33 of upper valve housing 35, the flow rate of crankcase fumes 27 through shell 30 is increased to a "relatively high" flow rate and flow restrictor 40 moves upwardly in upper valve housing 35 to overcome a downward biasing force applied by plate support 50 (so as to compress plate support 50) and moves to a higher elevation in shell 30. As shown in FIG. 6, in a low-temperature idle condition, base 44 is elevated at a first distance 91 above restrictor platform 54 and is separated from rim 37 by distance 82. As shown in FIG. 7, in a high-temperature idle condition, base 44 is elevated at a slightly lower second distance 92 above restrictor platform 54 and is separated from rim 37 by distance 83.

In operation, flow restrictor 40 moves to assume various predetermined positions in flow-metering orifice 39 as the effective size of flow-metering orifice 39 is enlarged and reduced to control flow of metered fumes 28 discharged by PCV valve 10 to engine intake manifold 16 as a function of the temperature and pressure of crankcase fumes 27 extant in shell 30. To account for temperature, deformable orifice plate 36 changes shape to enlarge or reduce the effective size of flow-metering orifice 39 and, at the same time, to account for pressure, remains in an initial position or moves to compress plate support 50 to assume an elevated position above the initial position. Thus, deformable orifice plate 36, flow restrictor 40, and plate support 50 cooperate to relocate flow restrictor in flow-metering orifice 39 while resizing flow-metering orifice 39 as a function of (1) pressure established by engine throttle valve position (e.g., idle or wide-open) and (2) crankcase fume temperature (e.g., cold at cold-engine start and hot during hot-running operation).

As shown in FIG. 4, PCV valve 10 is placed in a low-temperature, wide-open throttle condition during cold engine condition 78 and low-vacuum condition 149 to establish a first effective size of variable flow-metering channel 45. This condition occurs at wide-open throttle, when the need for fuel/air mixture is greater, blow-by production is high, and the vacuum in engine intake manifold 16 is low. When this happens, upright pintle 46 is exposing small-diameter, first-stage control portion 41 to an enlarged-size flow-metering orifice 39 to enlarge flow metering channel 45 (e.g., increase flow area) and therefore flow of fumes 27 through PCV valve 10.

As shown in FIG. 5, PCV valve 10 is placed in a high-temperature, wide-open throttle condition during hot engine condition 79 and low-vacuum condition 149 to establish a second effective size of variable flow-metering channel 45. This condition occurs at wide-open throttle during hot operating conditions, when the need for fuel/air mixture is greater, blow-by production is high, and the vacuum in engine intake manifold 16 is low. When this happens, pintle 46 is exposing small-diameter, first-stage control portion 41 to a reduced-size flow-metering orifice 39. Deformable orifice plate 36 has substantially flattened because it is made of a temperature-activated material such as a shape-memory alloy that is "programmed" to move to assume this "first" shape when exposed to high-temperature fuel vapor 27". The flow rate in this hot high flow condition is lower than in the cold high flow condition shown in FIG. 4 due to a reduced flow area as a result of a relatively smaller flow-metering channel 45.

As shown in FIG. 6, PCV valve 10 is placed in a low-temperature idle condition during cold engine condition 78 and high-vacuum condition 151 to establish a third effective size of variable flow-metering channel 45. This condition occurs at idle when throttle valve 24 is closed partly, the need for fuel/air mixture is minimal, blow-by production is low, and the vacuum in engine intake manifold 16 is high and this creates high flow into engine intake manifold 16. When this happens, pintle 46 is sucked upwardly into flow-metering orifice 39, reducing the effective size of flow-metering channel 45 (e.g., flow area) and therefore the flow through PCV valve 10. Plate support 50 is calibrated to allow pintle 46 to operate on large-diameter, third-stage control portion 43 in such cold low-flow conditions.

As shown, for example, in FIG. 6A, deformable orifice plate 36 is formed and calibrated in a way such that the fins 38 are raised upwardly relative to rim 37 to create a convex "dome" having a substantially frustoconical second shape in cold operating conditions to create a larger diameter and an increased flow area, therefore increasing the flow rate through flow-metering orifice 39. Sludging and freezing problems are minimized by allowing for high flow rates during cold operating conditions.

As shown in FIG. 7, PCV valve 10 is placed in a high-temperature idle condition during hot engine condition 79 and high-vacuum condition 151 to establish a fourth effective size of variable flow-metering channel 45. This condition occurs at idle when throttle valve 24 is closed partly, the need for fuel/air mixture is minimal, blow-by production is low, and the vacuum in engine intake manifold 16 is high and this creates high flow into engine intake manifold 16. When this happens, pintle 46 gets sucked upwardly into flow-metering orifice 39, reducing flow area, and therefore flow through PCV valve 10. Pintle 46 operates on large-diameter, third-stage control portion 43 in hot low-flow conditions. The flow rate in the hot low-flow condition is lower than cold low-flow conditions due to reduced flow area 45 through flow-metering orifice 39.

As shown, for example, in FIG. 7A, deformable orifice plate 36 is formed and calibrated in a way such that fins 38 flatten to create a smaller diameter and reduced flow area during hot temperature conditions. This creates lower flow rates both at idle and wide-open throttle during hot conditions as compared to cold conditions. Oil is conserved by allowing lower flow rates in hot conditions when sludging and freezing are not as much of a problem.

The invention claimed is:

1. A positive crankcase ventilation PCV valve for use with a vehicle engine having a throttle valve movable between an idle position and a wide-open position, the PCV valve comprising a valve housing shell formed to include an interior region, an inlet opening into the interior region, and an outlet opening into the interior region, a flow regulator including a deformable orifice plate being arranged to lie in the interior region of the valve housing shell to partition the interior region into an inlet chamber coupled to the inlet and adapted to be coupled to a crankcase of a vehicle and an outlet chamber coupled to the outlet and adapted to be coupled to an engine intake manifold of a vehicle, the deformable orifice plate being formed to include a variable-size flow-metering orifice and made of a deformable material to cause the variable-size flow-metering orifice to have a first effective size upon deformation of the deformable orifice plate to assume a first shape and a relatively larger second effective size upon deformation of the deformable orifice plate to assume a second shape, and a flow restrictor located in the interior region of the valve housing shell and arranged to extend into the variable-size flow-metering orifice formed in the deformable orifice plate to define a variable flow-metering channel therebetween, the flow restrictor being mounted for movement in the variable-size flow-metering orifice to vary an effective size of the variable flow-metering channel between (1) a low-vacuum position supported on a restrictor platform included in the valve housing shell to extend through the variable-size flow-metering orifice in response to exposure of the flow restrictor to a low-level vacuum extant in the outlet chamber when the throttle valve has been moved to the wide-open position and located to establish a first effective size of the variable flow-metering channel upon deformation of the deformable orifice plate to assume the first shape and to establish a second effective size of the variable flow-metering channel upon deformation of the deformable orifice plate to assume the second shape and (2) a high-vacuum position located away from and unsupported by the restrictor platform to extend through the variable-size flow-metering orifice in response to exposure of the flow restrictor to a high-level vacuum extant in the outlet chamber that is greater than the low-level vacuum when the throttle valve has been moved to the idle position and to establish a third effective size of the variable flow-metering channel upon deformation of the deformable orifice plate to assume the first shape and to establish a fourth effective size of the variable flow-metering channel upon deformation of the deformable orifice plate to assume the second shape, and wherein each of the first, second, third, and fourth effective sizes of the variable flow-metering channel is different from one another to regulate flow of crankcase fumes passing therethrough as a function of deformable orifice plate shape and outlet chamber vacuum magnitude.

2. The PCV valve of claim 1, wherein the deformable orifice plate includes a rim and a plurality of fins coupled to the rim and arranged to define the variable-size flow-metering orifice therebetween.

3. The PCV valve of claim 2, wherein the fins are made of a temperature-activated material and configured to expand and move relative to the rim to establish the first shape of the deformable orifice plate when heated to a predetermined transitional temperature in response to exposure to high-temperature fuel vapor admitted into the interior region of the valve housing shell through the inlet and to contract and move relative to the rim to establish the second shape of the deformable orifice plate when cooled in response to exposure to a low-temperature fuel vapor that has a temperature that is less than the predetermined transitional temperature and is admitted into the interior region of the valve housing shell through the inlet.

4. The PCV valve of claim 3, wherein the first shape of the deformable orifice plate is a substantially flat shape and the second shape is a substantially frustoconical shape.

5. The PCV valve of claim 3, wherein the flow restrictor includes a base adapted to engage the platform upon movement of the flow restrictor to assume the low-vacuum position and an upright pintle arranged to extend upwardly from the base and into the variable-size flow-metering orifice formed in the deformable orifice plate and wherein the flow regulator further includes a plate support arranged to engage the base of the flow restrictor and the rim of the deformable orifice plate and configured to support the deformable orifice plate normally in a predetermined position relative to the flow restrictor to cause the upright pintle to extend into the variable-shape flow-metering orifice and cooperate with the deformable orifice plate to define the variable flow-metering channel.

6. The PCV valve of claim 5, wherein the plate support is a compression spring configured to lie in a coil and wind around and in spaced-apart relation to a portion of the upright pintle.

7. The PCV valve of claim 5, wherein the pintle includes at least two differently sized control portions located between the base and the outlet of the valve housing shell and arranged to extend into the variable-size flow-metering orifice in response to movement of the base toward and away from the restrictor platform and wherein the base and the restrictor platform cooperate to define an empty space therebetween in response to movement of the flow restrictor to the high-vacuum position.

8. The PCV valve of claim 2, wherein the deformable orifice plate is monolithic and made of a temperature-activated material and wherein the fins are configured to move relative to one another and to the rim when exposed to changing temperature to vary the size of the variable-size flow-metering orifice defined between the fins.

9. The PCV valve of claim 8, wherein the first shape of the deformable orifice plate is a substantially flat shape and the second shape is a substantially frustoconical shape.

10. The PCV valve of claim 8, wherein the flow regulator further includes a plate support located in the interior region of the valve housing shell and coupled to the rim of the deformable orifice plate and a portion of the flow restrictor.

11. The PCV valve of claim 10, wherein the plate support is a compression spring configured to yield in response to changing pressure conditions in the interior region of the valve housing shell to change the elevation of the deformable orifice plate relative to the flow restrictor.

12. The PCV valve of claim 10, wherein the flow restrictor includes a base and an upright pintle coupled to the base and arranged to extend through the variable-size flow-metering orifice and the plate support is coupled to and interposed between the rim of the deformable orifice plate and the base of the flow restrictor.

13. The PCV valve of claim 1, wherein the deformable orifice plate is made of a temperature-activated material and configured to deform when exposed to changing temperature of crankcase fumes flowing through the interior region of the valve housing shell to change the effective size of the variable-size flow-metering orifice formed in the deformable orifice plate.

14. The PCV valve of claim 13, wherein the deformable orifice plate includes an outer rim and radially inwardly extending fins cantilevered to an inner edge of the outer rim, the variable-size flow-metering orifice is defined by space provided between the fins, and the effective size of the variable-size flow-metering orifice changes as the fins move relative to the outer rim and to one another as the temperature of crankcase fumes flowing around and over the fins changes.

15. The PCV valve of claim 14, wherein the flow regulator further includes a plate support located in the interior region of the valve housing shell and coupled to the rim of the deformable orifice plate and a portion of the flow restrictor.

16. The PCV valve of claim 15, wherein the plate support is a compression spring configured to yield in response to changing pressure conditions in the interior region of the valve housing shell to change the elevation of the deformable orifice plate relative to the flow restrictor in the interior region of the valve housing shell and relative to the platform.

17. The PCV valve of claim 13, wherein the flow regulator further includes a plate support located in the interior region of the valve housing shell and interposed between the deformable orifice plate and a base of the flow restrictor and wherein the flow restrictor further includes an upright pintle coupled to the base and arranged to extend upwardly from the base into the variable-size flow-metering orifice formed in the deformable orifice plate.

18. The PCV valve of claim 17, wherein the plate support is a compression spring configured to yield in response to changing pressure conditions in the interior region of the valve housing shell to change the elevation of the deformable orifice plate relative to the flow restrictor in the interior region of the valve housing shell and relative to the platform.

19. The PCV valve of claim 17, wherein the plate support is a compression spring configured to lie in a coil and wind around and in spaced-apart relation to a portion of the upright pintle.

20. The PCV valve of claim 13, wherein the first shape of the deformable orifice plate is a substantially flat shape and the second shape is a substantially frustoconical shape.

21. A positive crankcase ventilation PCV valve for use with a vehicle engine having a throttle valve movable between an idle position and a wide-open position, the PCV valve comprising
a valve housing shell formed to include an interior region, an inlet opening into the interior region, and an outlet opening into the interior region,
a restrictor platform included in the valve housing shell and located in the interior region,
a deformable orifice plate located in the interior region and formed to include a variable-size flow-metering orifice,
a flow restrictor arranged to rest normally in the interior region on the restrictor platform and extend into the variable-size flow-metering orifice formed in the deformable orifice plate to define a variable flow-metering channel therebeween, and
a plate support located in the interior region and arranged to support the deformable orifice plate in more than one position relative to the flow restrictor.

22. The PCV valve of claim 21, wherein the deformable orifice plate is made of a temperature-activated material and configured to deform when exposed to changing temperature of crankcase fumes flowing through the interior region of the valve housing shell to change the effective size of the variable-size flow-metering orifice formed in the deformable orifice plate.

23. The PCV valve of claim 21, wherein the deformable orifice plate is configured to expand to establish a substantially flat shape when heated to a predetermined transitional temperature and to contract to establish a substantially frustoconical shape when cooled to a temperature below the predetermined transitional temperature.

24. The PCV valve of claim 22, wherein the deformable orifice plate includes an outer rim and radially inwardly extending fins cantilevered to an inner edge of the outer rim, the variable-size flow-metering orifice is defined by space provided between the fins, and the effective size of the variable-size flow-metering orifice changes as the fins move relative to the outer rim and to one another as the temperature of crankcase fumes flowing around and over the fins changes.

25. The PCV valve of claim 24, wherein the plate support is coupled to the rim of the deformable orifice plate and a portion of the flow restrictor.

26. The PCV valve of claim 24, wherein the flow regulator further includes a plate support located in the interior region of the valve housing shell and interposed between the deformable orifice plate and a base of the flow restrictor and wherein the flow restrictor further includes an upright pintle coupled to the base and arranged to extend upwardly from the base into the variable-size flow-metering orifice formed in the deformable orifice plate.

27. The PCV valve of claim 21, wherein the deformable orifice plate includes a rim and a plurality of fins coupled to the rim and arranged to define the variable-size flow-metering orifice therebetween.

28. The PCV valve of claim 27, wherein the deformable orifice plate is monolithic and made of a temperature-activated material and wherein the fins are configured to move relative to one another and to the rim when exposed to changing temperature to vary the size of the variable-size flow-metering orifice defined between the fins.

29. A positive crankcase ventilation PCV valve for use with a vehicle engine having a throttle valve movable between an idle position and a wide-open position, the PCV valve comprising
a valve housing shell formed to include an interior region, an inlet opening into the interior region, and an outlet opening into the interior region,
a flow regulator including a deformable orifice plate and a plate support coupled to the deformable orifice plate, the deformable orifice plate being formed to include a variable-size flow-metering orifice that varies in size as a result of deformation of the deformable orifice plate, and a flow restrictor including a pintle that extends upwardly through the variable-size flow-metering orifice and a base underlying the pintle, wherein the plate support is coupled to the base to elevate the deformable orifice plate above the base and wherein the deformable orifice plate is made of a temperature-activated material and is configured to change shape when exposed to changing temperatures of crankcase fumes passing through the valve housing shell to change the effective size of the variable-size flow-metering orifice.

30. The PCV valve of claim 29, wherein the deformable orifice plate includes a rim and a plurality of fins coupled to the rim and arranged to define the variable-size flow-metering orifice therebetween.

31. The PCV valve of claim 30, wherein the fins are made of a temperature-activated material and configured to expand to establish a first shape of the deformable orifice plate providing one effective size of the variable-size flow-metering orifice when heated to a predetermined transitional temperature in response to exposure to high-temperature fuel vapor admitted into the interior region of the valve housing shell through the inlet and to contract to establish a second shape of the deformable orifice plate providing another effective size of the variable-size flow-metering orifice when cooled in response to exposure to a low-temperature fuel vapor that has a temperature that is less than the predetermined transitional temperature and is admitted into the interior region of the valve housing shell through the inlet.

32. The PCV valve of claim 31, wherein the first shape of the deformable orifice plate is a substantially flat shape and the second shape is a substantially frustoconical shape.

33. The PCV valve of claim 29, wherein the plate support is a compression spring configured to lie in a coil and wind around and in spaced-apart relation to a portion of the pintle.

34. The PCV valve of claim 29, wherein the plate support is a compression spring configured to yield in response to changing pressure conditions in the interior region of the valve housing shell to change the elevation of the deformable orifice plate relative to the flow restrictor.

35. The PCV valve of claim 29, wherein the deformable orifice plate includes an outer rim and radially inwardly extending fins cantilevered to an inner edge of the outer rim, the variable-size flow-metering orifice is defined by space provided between the fins, and the effective size of the variable-size flow-metering orifice changes as the fins move relative to the outer rim and to one another as the temperature of crankcase fumes flowing around and over the fins changes.

* * * * *